(12) United States Patent
Hubert et al.

(10) Patent No.: US 10,931,179 B2
(45) Date of Patent: Feb. 23, 2021

(54) FIBER GROUNDING BRUSH

(71) Applicant: Aktiebolaget SKF, Gothenburg (SE)

(72) Inventors: Mathieu Hubert, Ann Arbor, MI (US); Igor Dorrestijn, Woerden (NL); Karl Preis, Traun (AT)

(73) Assignee: AKTIEBOLAGET SKF, Gothenburg (SE)

( * ) Notice: Subject to any disclaimer, the term of this patent is extended or adjusted under 35 U.S.C. 154(b) by 304 days.

(21) Appl. No.: 15/926,606

(22) Filed: Mar. 20, 2018

(65) Prior Publication Data

US 2019/0296617 A1 Sep. 26, 2019

(51) Int. Cl.

| | |
|---|---|
| *H05K 13/04* | (2006.01) |
| *H02K 11/40* | (2016.01) |
| *H01R 39/39* | (2006.01) |
| *H02K 13/10* | (2006.01) |
| *H02K 15/14* | (2006.01) |
| *H02K 5/14* | (2006.01) |
| *H01R 39/38* | (2006.01) |

(52) U.S. Cl.
CPC ........... *H02K 11/40* (2016.01); *H01R 39/385* (2013.01); *H01R 39/39* (2013.01); *H02K 5/145* (2013.01); *H02K 13/10* (2013.01); *H02K 15/14* (2013.01); *Y10T 29/5313* (2015.01)

(58) Field of Classification Search
CPC . H02K 11/40; H02K 5/14; H02K 5/16; H02K 11/026; H02K 13/10; H02K 5/145; H02K 7/003; F16C 41/002; H01R 39/385; H01R 39/39; Y10T 29/5313

USPC ....... 29/729, 34 D, 596, 598, 725, 732, 757, 29/825, 826, 846, 850
See application file for complete search history.

(56) References Cited

U.S. PATENT DOCUMENTS

| | | | |
|---|---|---|---|
| 3,757,164 A | 9/1973 | Binkowski | |
| 4,801,270 A | 1/1989 | Scarlata | |
| 5,812,908 A | 9/1998 | LaRocca et al. | |
| 7,136,271 B2 | 11/2006 | Oh et al. | |
| 7,193,836 B2 * | 3/2007 | Oh ..................... | G11B 19/2009 361/212 |
| 7,339,777 B2 * | 3/2008 | Barnard ................. | H01R 39/64 361/212 |
| 8,169,766 B2 | 5/2012 | Oh et al. | |

(Continued)

FOREIGN PATENT DOCUMENTS

DE 202014105015 U1 10/2014

*Primary Examiner* — Thiem D Phan
(74) *Attorney, Agent, or Firm* — J-Tek Law PLLC; Scott T. Wakeman; Mark A. Ussai

(57) ABSTRACT

A grounding brush includes a wire extending along an arc, a plurality of conductive fibers each bent into a U-shape around the wire, and at least one support including a channel crimped about the fibers and wire to secure them to the channel. An assembly includes a mounting plate having an opening configured to surround a rotatable motor shaft having an axis of rotation, a plurality of tabs disposed in a circle around the periphery, each of the tabs extending axially from the first side of the mounting plate and radially toward the axis of rotation to define with an adjacent portion of the first side of the mounting plate a U-shaped bracket and a grounding brush mounted in the plurality of U-shaped brackets with the conductive fibers extending radially inward or outward. Also a method of mounting and adjusting the grounding brush in the assembly.

10 Claims, 4 Drawing Sheets

(56) References Cited

U.S. PATENT DOCUMENTS

| | | |
|---|---|---|
| 9,581,203 B2 | 2/2017 | White et al. |
| 2006/0007609 A1 | 1/2006 | Oh et al. |
| 2015/0256054 A1 | 9/2015 | Northwall et al. |

\* cited by examiner

FIBER GROUNDING BRUSH

TECHNOLOGICAL FIELD

The present disclosure is directed to a fiber grounding brush, a fiber grounding brush assembly and a method of installing the fiber grounding brush to a device having a rotatable shaft, and, more specifically, toward a fiber grounding brush and fiber grounding brush assembly that can be installed on motors having a variety of motor shaft diameters and toward a method of adjusting a grounding brush assembly.

BACKGROUND

A bearing may be mounted in a frame of a motor or other machine to support a rotary shaft. It is often desirable to electrically ground the shaft. This is because, when the shaft rotates, a difference in electrical potential can arise between the shaft and the motor or machine. This in turn creates an electrical potential between an inner bearing ring (connected to the shaft) and an outer bearing ring (connected directly or indirectly to the motor or motor housing) which potential difference can lead to a discharge of current through the bearing assembly. This problem is of particular concern in AC electric motors, especially when the alternating current is produced by pulse-width modulation techniques.

Current passing through a bearing can damage the raceways and rolling elements of the bearing. Electrical discharges can also create vibrations which increase the acoustical noise of a system. In addition, high frequency circulating currents produced by the potential difference can induce electromagnetic noise that may adversely affect external electric devices.

It is known to ground a rotating shaft by using a grounding brush having conductive fibers, fibers of copper or carbon, for example. The grounding brush is mounted to a motor housing or frame such that distal ends of the fibers lightly contact the outer surface of the rotating shaft. Because the fibers are conductive, the shaft is maintained at the same electrical potential as the housing. This maintains the inner and outer rings of the bearing supporting the shaft at the same electrical potential and eliminates or substantially eliminates problematic electrical discharges through the bearings.

However, the configuration of conventional grounding brush assemblies generally must be specific to the size and shape of the shaft and housing to be grounded. Different grounding brush assemblies must thus be designed for every motor or other machine having a rotating shaft that requires grounding. It would therefore be desirable to provide a grounding brush assembly that can be used on a variety of different motors and other machines and that can be adapted to machines that have shafts and/or other elements of different sizes.

SUMMARY

These and other problems are addressed by embodiments of the present disclosure, a first aspect of which comprises a grounding brush that includes at least one wire having a first end and a second end and that extends along an arc of a circle. The brush also includes a plurality of conductive fibers each bent into a U-shape around the at least one wire. The U-shaped fibers each have a first leg, a second leg and a bight and are disposed along the length of the at least one wire such that the at least one wire extends along an inner side of the bight. The brush also includes at least one support comprising a circumferentially extending radially facing channel having a first circumferential side wall and a second circumferential side wall axially spaced from the first circumferential side wall, the first and second side walls being crimped toward each other with sufficient force to secure the fibers and the at least one wire in the at least one channel.

Another aspect of the disclosure is a grounding brush assembly that includes a mounting plate having a first side and a second side and an opening configured to surround a rotatable motor shaft having an axis of rotation, which opening has a periphery. A plurality of tabs are disposed in a circle around the periphery, and each of the tabs extends axially from the first side of the mounting plate and radially toward or away from the axis of rotation to define with an adjacent portion of the first side of the mounting plate a U-shaped bracket. A grounding brush as described above is mounted in the plurality of U-shaped brackets with the conductive fibers extending radially.

Yet another aspect of the disclosure is a method that includes installing the grounding brush assembly of the previous paragraph to a motor housing or to a bearing outer ring such that the rotatable motor shaft extends though the opening and attaching the mounting plate to the motor housing or to the bearing outer ring.

A further embodiment of the disclosure comprises a grounding brush assembly that includes at least one support and a plurality of conductive fibers extending from the at least one support, a mounting plate having a first side and a second side and an opening configured to surround a rotatable motor shaft having an axis of rotation, the opening having a periphery, and a plurality of tabs disposed in a circle around the periphery. Each of the tabs extends axially from the first side of the mounting plate and radially toward or away from the axis of rotation to define with an adjacent portion of the first side of the mounting plate a U-shaped bracket. The at least one support is secured against the first side of the mounting plate by the plurality of tabs.

BRIEF DESCRIPTION OF THE DRAWINGS

These and other aspects and features of the disclosure will be better understood after a reading of the following detailed description together with the attached drawings, wherein.

DETAILED DESCRIPTION

Figure 1:
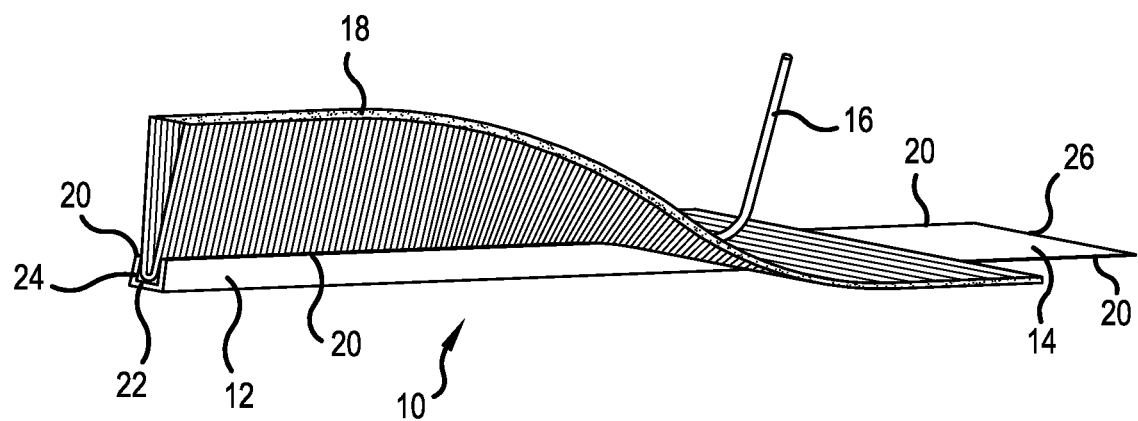
FIG. 1 is schematic perspective view of a grounding brush according to an embodiment of the present disclosure in the process of being manufactured.

Referring now to the drawings, wherein the showings are for the purpose of illustrating embodiments of the disclosure only and not for the purpose of limiting same, FIG. 1 shows a grounding brush 10 that includes a support 12 formed from a strip 14 of conductive material such as aluminum, steel, copper or silver, a binding wire 16 and a plurality of conductive fibers 18, which fibers are carbon fibers in this embodiment. As will be appreciated from the right side of FIG. 1, which shows the grounding brush 10 in the process of being assembled, the grounding brush 10 is formed by laying the plurality of conductive fibers 18 across the width of the aluminum strip 14, placing the binding wire 16 on the conductive fibers 18 along the longitudinal centerline of the strip 14 and bending the longitudinal sides 20 of the strip 14 toward each other to fold the conductive fibers 18 in half around the binding wire 16. Bending the strip 14 in this manner forms a channel 22 defined by the longitudinal side edges 20 of the strip 14, and the side edges 20 are pressed toward each other to compress the conductive fibers therebetween with enough force to secure the conductive fibers 18 in the channel 22. This simple structure, which is conventionally used for brushes with non-conductive fibers but not known to have been used for grounding brushes, allows a grounding brush 10 of any desired length to be formed, which grounding brush can then be cut to a size required for a particular application.

Figure 2:
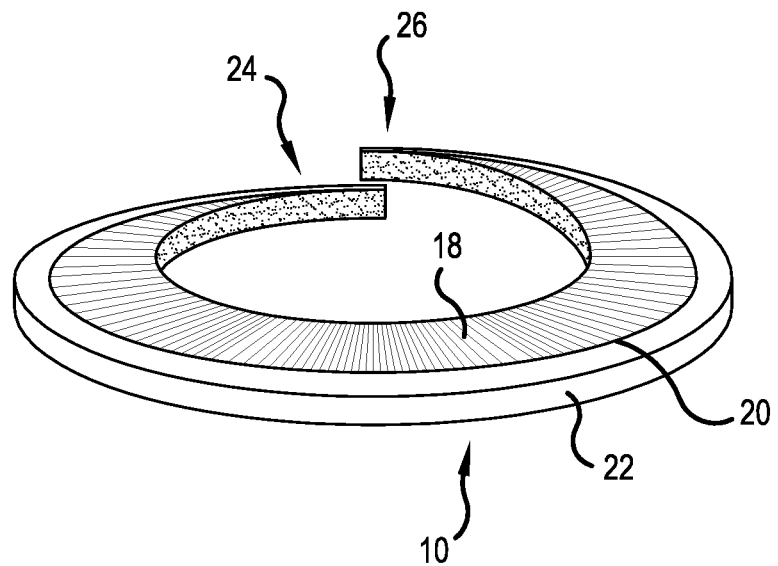
FIG. 2 is a perspective view of a grounding brush according to the present disclosure.
Figure 3:
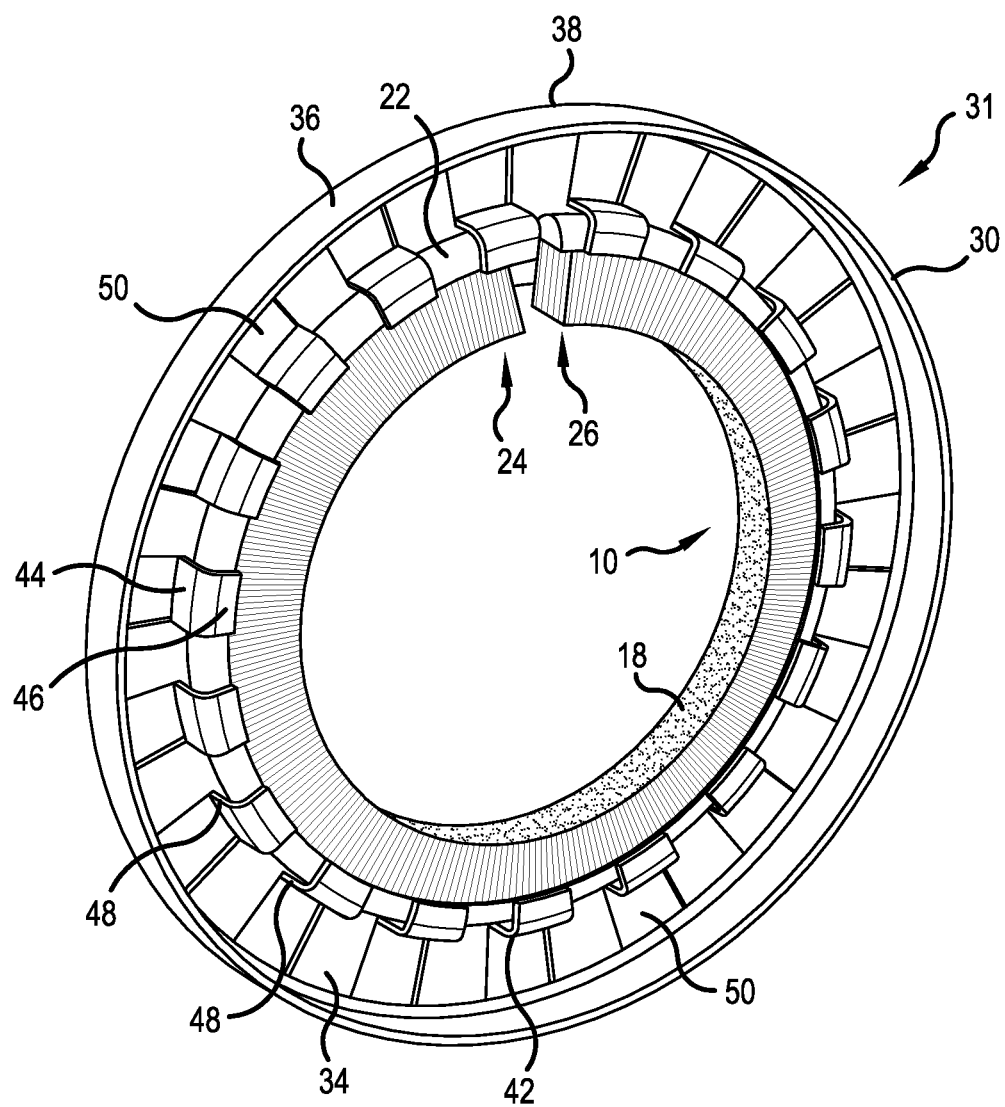
FIG. 3 is a rear perspective view of a grounding brush assembly according to the present disclosure which includes a mounting plate and the grounding brush of FIG. 2.

After forming a suitable straight length of the grounding brush 10, the grounding brush 10 is bent into a circular arc so that a first end 24 of the grounding brush is circumferentially spaced from a second end 26 of the grounding brush 10. FIG. 2 shows the grounding brush 10 bent into this final form, although the ends 24 and 26 are not readily visible through the conductive fibers 14. FIG. 3 better shows a gap between the first end 24 and the second end 26 of the grounding brush 10. As will be discussed hereinafter, it must be possible to change the diameter of the grounding brush 10 by applying a radial and/or circumferential force to the grounding brush. Thus, the first end 24 may be spaced from the second end 26 by an open gap (as illustrated in FIG. 3) or the first end 24 may circumferentially overlap the second end 26. If the first and seconds ends 24, 26 overlap, this will result in more fibers in contact with the shaft which in turn will allow the grounding brush 10 to carry more current. In any case, the first end 24 is not fixed to the second end 26 in a manner that would prevent the diameter of the brush 10 from being changed. Furthermore, while the conductive fibers 18 are shown extending radially inward, in other embodiments (see FIG. 10), the channel 22 may face radially outward so that the conductive fibers 18 project radially outward from the channel 22. In addition, while it will often be desirable to use a grounding brush 10 formed from a single channel 22 bent into a circular arc of slightly less than 360 degrees, multiple grounding brushes that extend around smaller circular arcs, i.e., two grounding brushes that extend along circular arcs of slightly less than 180 degrees, could be used in situations where this might simplify installation.

Figure 5:
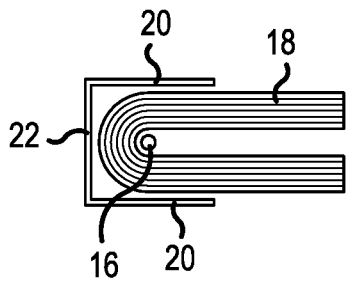
FIG. 5 is a sectional view through a grounding brush according to an embodiment of the present disclosure which grounding brush is formed from individual conductive fibers.
Figure 6:
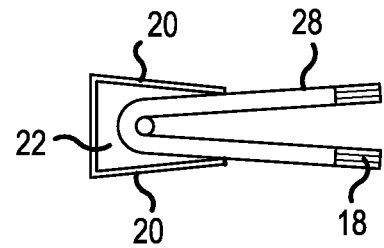
FIG. 6 is a sectional view through a grounding brush according to an embodiment of the present disclosure which grounding brush is formed from sheathed bundles of individual conductive fibers.

FIG. 5 is a sectional view through a finished section of the grounding brush 10 showing the individual conductive fibers passing around the binding wire 16. Instead of individual conductive wires 14, subsets of the conductive fibers 14 can be wrapped in or coated by polymer sheaths 28, and the sheaths 28 can be passed around the binding wire 16 as illustrated in FIG. 6. The sheaths 28 may be conductive; however even when non-conductive sheaths 28 are used, the portion of the sheaths 28 in contact with the rotating shaft tends to wear quickly and expose the conductive fibers 18 to the shaft. Sheathing sets of conductive fibers in this manner makes the conductive fibers, which can have a diameter on the order of 5 to 100 microns, easier to handle and install without affecting the operation of the grounding brush 10. Protected in this manner, the individual conductive fibers 18 are also less likely to break during use. This reduces the potential problem of broken fibers finding their way into a bearing or operating motor and causing damage or premature wear.

Figure 4:
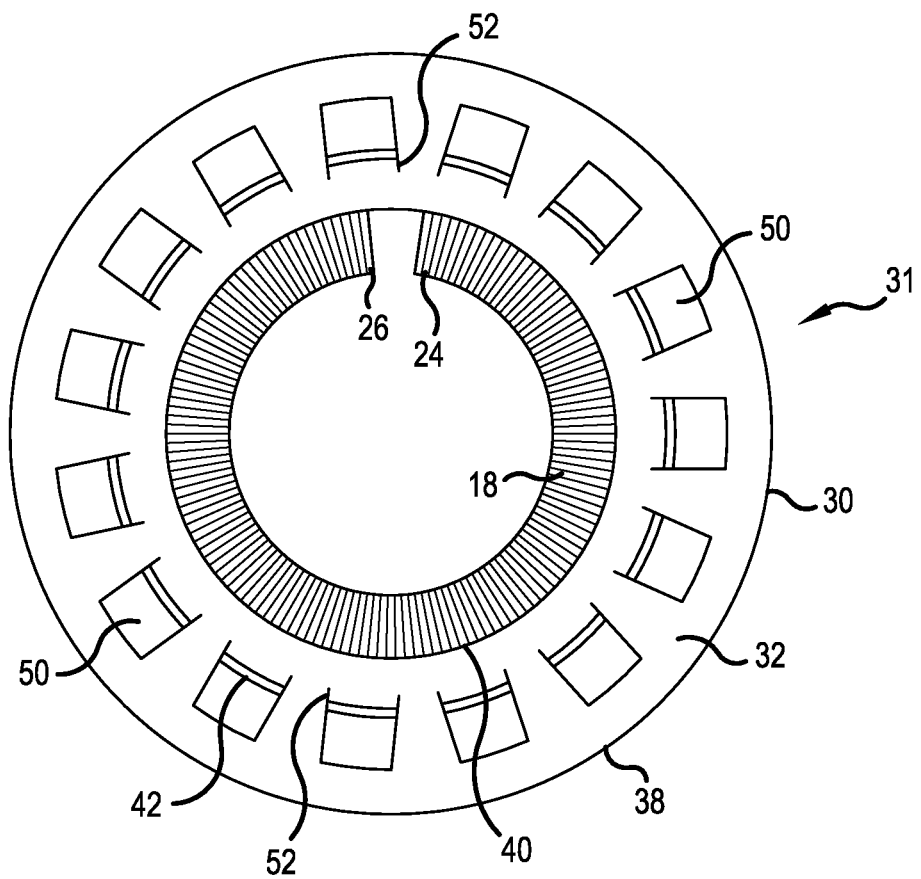
FIG. 4 is a front elevational view of the grounding brush assembly of FIG. 3.
Figure 10:
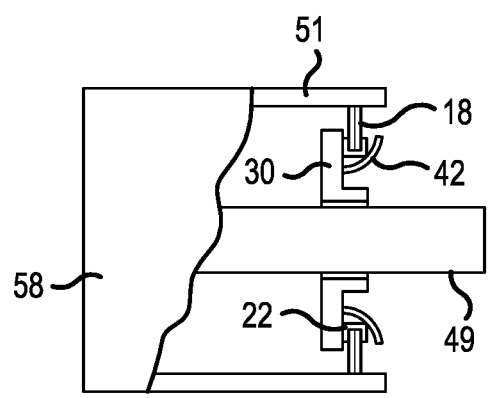
FIG. 10 is a sectional side elevational view of a grounding brush assembly according to another embodiment mounted between a fixed shaft and a rotatable housing.

Once formed, the grounding brush 10 is attached to a mounting plate 30, illustrated, for example, in FIGS. 3 and 4, to form a grounding brush assembly 31. The mounting plate 30 has a front 32 and a rear 34, and a flange 36 that extends from the plane of the mounting plate 30 to the rear. The mounting plate 30 has a circular outer periphery 38 and a center opening 40 best seen in FIG. 4. A plurality of tabs 42 are punched or otherwise formed in the mounting plate 30 so that they extend axially to the rear side of the mounting plate 30 and extend radially inwardly as well. Each of the tabs 42 includes a axial wall 44 projecting axially from the rear 34 of the mounting plate 30 and a radial wall 46 projecting radially inward from an end of the axial wall 44. The radial wall 46 is substantially parallel to the rear 34 of the mounting plate 30 and defines, with the axial wall 44 and a portion of the rear 34 of the mounting plate 30 adjacent to the axial wall 44 a U-shaped bracket 48. These U-shaped brackets 48 extend in a circle around the center opening 40 to define a mounting path or mounting location for the grounding brush 10. These U-shaped brackets 48 face radially inwardly. As illustrated in FIG. 10, the grounding brush assembly 31 may configured with radially outwardly extending conductive fibers 18 to allow a grounding brush assembly 31 to be mounted on a shaft 49 which is fixed relative to a rotatable element 51. In this embodiment, the U-shaped brackets 48 face radially outward. Holes 50 are left in the mounting plate 30 where each of the tabs 42 is formed.

After the tabs 42 are cut from the mounting plate 30, they are bent axially and radially inward to define a mounting location for a grounding brush having a given diameter. That is, the tabs 42 can be bent slightly so that the U-shaped brackets 48 formed thereby define a relatively large circle along which large diameter grounding brush 10 can be mounted, or the tabs 42 can be bent further radially inward so that the U-shaped brackets define a smaller circle along which a smaller diameter grounding brush 10 can be mounted. Because the grounding brushes 10 are formed with the ends thereof circumferentially spaced (either overlapping or separated by a gap), the tabs 42 can also be compressed when a grounding brush 10 is already retained in the U-shaped brackets 48 to press the circumferentially spaced ends of the grounding brush 10 toward each other and thereby decrease the diameter of the grounding brush 10 and the opening defined by the inner ends of the conductive fibers 18. In embodiments where the conductive fibers 18 extend radially outwardly from U-shaped brackets 48, the tabs 42 would be bent radially outwardly to increase the diameter of a grounding brush 10.

Slits 52, which can be seen in FIG. 4, extend radially inwardly from the location at which the axial wall 44 extends from the mounting plate 30. These slits 52 allow the tabs 42 to be bent or "peeled" further radially inward to change the size of the circle defined by the U-shaped brackets 48. Due to the presence of these slits 52, pressing radially inward on the axial walls 44 will tend to pull material of the mounting plate 30 out of the plane of the mounting plate 30 and lengthen the axial wall 44 of the tabs 42 as the axial walls 44 are at the same time pressed radially inward.

Figure 7:
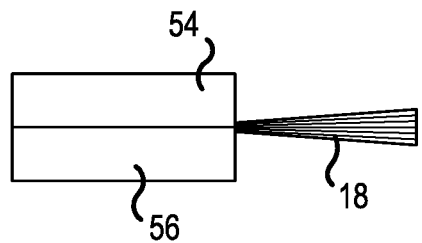
FIG. 7 is a sectional view through a grounding brush according to an embodiment of the present disclosure which grounding brush is formed by fibers clamped between parallel plates.

FIG. 7 shows that a grounding brush suitable for use with the mounting plate 30 can be formed differently from the grounding brush 10 described above. Specifically, a grounding brush 10' can be formed by providing two parallel plates 54, 56 and securing them to each other to sandwich the ends of a plurality of conductive fibers 18 therebetween. The plates 54, 56, can then be formed into an arc with the conductive fibers 18 extending radially inward and mounted in the U-shaped brackets 48 of the mounting plate 30. Other grounding brush designs can be used with the mounting plate 30 without exceeding the scope of this disclosure.

Figure 8:
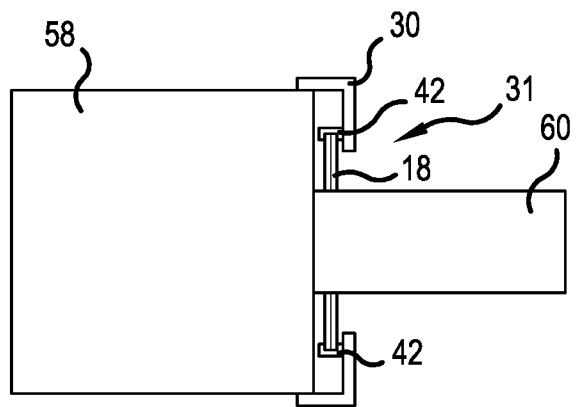
FIG. 8 is a side elevational view of the grounding brush assembly according to FIG. 3 mounted to a motor housing.

Once formed, the grounding brush assembly 31 may be connected to a motor housing 58 having a rotatable shaft 60 extending therefrom as illustrated in FIG. 8. To attach the grounding brush assembly 31, the flange 36 is pressed onto the outer circumference of the motor housing 58 and secured by a friction fit or with suitable fasteners or adhesive (not illustrated). Alternately, the flange 36 could be inserted into a (not illustrated) circular slot on the motor housing 58 with the shaft 60 of the motor extending through the central opening 40 and the free ends of the conductive fibers 18 face the shaft 60.

Figure 9:
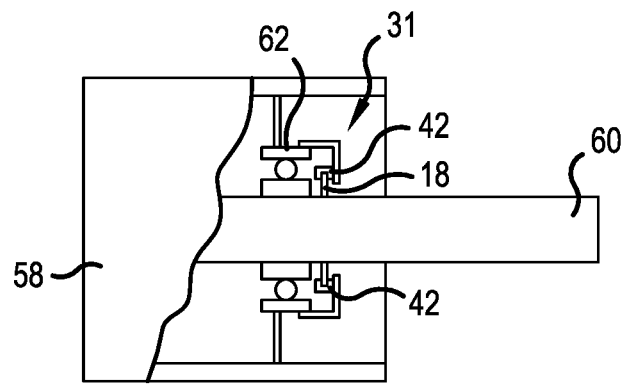
FIG. 9 is a side elevational view of the grounding brush assembly according to FIG. 3 mounted to an outer ring of a bearing inside a motor housing.

In a further alternative, as illustrated in FIG. 9, the grounding brush assembly 31 can be mounted directly to an outer bearing ring such as the outer bearing ring 62 located inside the motor housing 58, with the free ends of the conductive fibers 18 facing the shaft 60.

When the grounding brush assembly 31 is mounted to the motor housing 58, the holes 50 allow airflow through the grounding brush assembly 31 and thus improve cooling. When the grounding brush assembly 31 is mounted to the bearing outer ring 62, the holes 50 allow lubricant to flow freely through the mounting plate 50 which also provides improved cooling and lubrication. Due to the presence of the holes 50, the normal flow of liquid or gas won't be obstructed by the grounding brush assembly 31.

One benefit of the above-described configuration of the grounding brush assembly 31 is that the shape of the tabs 42 can be changed to control the diameter of the circle formed by the free ends of the conductive fibers 18. In other words, if the tabs 42 are formed so that the axial walls 44 thereof are located at a first distance from the outer periphery 38, the U-shaped brackets 48 formed thereby will define a circular path for the grounding brush 10 that has a first diameter. If the tabs 42 are bent so that the axial walls 44 are then located further inward from the outer periphery 38, the U-shaped brackets 48 will define a circular path for the grounding brush 10 that has a second diameter smaller than the first diameter. Outwardly facing U-shaped channels can be modified in the same manner.

Because the first end 24 of the grounding brush 10 can move relative to the second end 26 of the grounding brush 10, the grounding brush 10 can be mounted in the U-shaped brackets 48 when the axial walls 44 of the U-shaped brackets are located at a range of distances from the outer periphery 38 of the mounting plate. The gap between the first and second ends 24, 26 will increase and decrease in size depending on the size of the circle defined by the U-shaped brackets 48. In this manner, the same grounding brush assembly 31 can be used for motor shafts 60 of different diameters and it is not necessary to produce a different mounting bracket 30/grounding brush assembly 31 for every different motor shaft diameter.

The shape of the tabs 42 can be adjusted before or after the grounding brush assembly is connected to the motor housing 58 or the bearing outer ring 62. For example, before the grounding brush assembly 31 is attached to the motor housing 58 or the outer bearing ring 62, the grounding brush 10 may be mounted in the U-shaped brackets 48 with a circumferential gap between the first and second ends 24, 26 of the grounding brush 10. The axial walls 44 of the U-shaped brackets 48 can then be pressed radially inwardly until the free ends of the conductive fibers 18 form a circle having a desired diameter. Or, if the grounding brush assembly 31 is to be mounted to the motor housing 58 or the outer bearing ring 62 before a final adjustment of the inner diameter of the grounding brush assembly is carried out, the tabs 42 will be configured so that the free ends of the conductive fibers 18 define a circle larger than the outer diameter of the shaft 60. The grounding brush assembly 31 is then mounted to the motor housing 58 or the outer bearing 62 and after that the axial walls 44 thereof can then be pressed radially inwardly until the free ends of the conductive fibers 18 of the grounding brush 10 just contact the outer surface of the shaft 60.

Furthermore, if the ends of the conductive fibers 18 wear during operation of the motor so that they no longer touch the outer surface of the shaft 60, the tabs 42 can be bent further radially inward until the conductive fibers 18 again make contact with the rotating shaft. This allows a given grounding brush to be used for a longer time before it becomes necessary to replace the grounding brush 10.

The present invention has been disclosed above in terms of preferred embodiments. Various additions and modifications to these embodiments will become apparent to persons of ordinary skill in the art upon a reading of the foregoing description. It is intended that all additions and modifications form a part of the present invention to the extent they fall within the scope of the several claims appended hereto.

We claim:

1. A grounding brush comprising:
   at least one wire having a first end and a second end and a length, the at least one wire extending along an arc of a circle;
   a plurality of conductive fibers each bent into a U-shape around the at least one wire, the U-shaped fibers each having a first leg, a second leg and a bight and being disposed along the length of the at least one wire such that the at least one wire extends along an inner side of the bight; and
   at least one support comprising a circumferentially extending radially facing channel having a first circumferential side wall and a second circumferential side wall axially spaced from the first circumferential side wall, the first and second side walls being crimped toward each other with sufficient force to secure the fibers and the at least one wire in the at least one channel.

2. The grounding brush according to claim 1, wherein the plurality of conductive fibers comprises a first subset of the plurality of conductive fibers coated with a first polymer sheath and a second subset of the plurality of conductive fibers different than the first subset of the plurality of conductive fibers coated with a second polymer sheath.

3. The grounding brush according to claim 1, wherein the at least one wire has at least one end and wherein a first one of the at least one end is spaced circumferentially from a second one of the at least one end.

4. The grounding brush according to claim 1, wherein the conductive fibers comprise carbon fibers.

5. The grounding brush according to claim 1, wherein the at least one support is electrically conductive and in electrical contact with the conductive fibers.

6. The grounding brush according to claim 1, wherein the first leg and the second leg extend radially inward from the at least one support and wherein the radially facing channel faces radially inward.

7. The grounding brush according to claim 1, wherein the first leg and the second leg extend radially outward from the at least one support and wherein the radially facing channel faces radially outward.

8. A grounding brush assembly comprising:
a mounting plate having a first side and a second side and an opening configured to surround a rotatable motor shaft having an axis of rotation, the opening having a periphery;
a plurality of tabs disposed in a circle around the periphery, each of the tabs extending axially from the first side of the mounting plate and radially toward or away from the axis of rotation to define with an adjacent portion of the first side of the mounting plate a U-shaped bracket; and
the grounding brush according to claim 1 mounted in the plurality of U-shaped brackets with the conductive fibers extending radially.

9. The assembly according to claim 8, wherein each tab is a punched portion of the mounting plate folded to form the U-shaped bracket and wherein the mounting plate includes a hole adjacent to each tab.

10. The assembly according to claim 9, wherein the U-shaped brackets are compressed against the at least one support to retain the grounding brush on the mounting plate.

* * * * *